Nov. 10, 1942.    J. S. ALSPAUGH    2,301,497
POWER TRANSMITTING DEVICE
Filed Nov. 30, 1939

Inventor
JAMES S. ALSPAUGH
By
Finkel & Finkel
Attorney

Patented Nov. 10, 1942

2,301,497

UNITED STATES PATENT OFFICE 2,301,497

POWER TRANSMITTING DEVICE

James S. Alspaugh, Portsmouth, Ohio

Application November 30, 1939, Serial No. 306,865

2 Claims. (Cl. 74—305)

This invention relates to power transmitting mechanisms especially adapted for use in airplane motors but the principle of which can readily be used in connection with power shafts generally.

An object of the invention is to provide an improved and simplified means whereby an improved yielding drive or clutch is incorporated between the driving and driven shafts.

Another object of the invention is to provide a simple and efficient symmetrically balanced drive means associated with spaced shafts whereby power may be transmitted from one of the shafts to the other.

Further objects of the invention will be apparent from the following disclosure in connection with the drawing herein.

The invention is embodied in the examples shown in the accompanying drawing and set forth in the description.

In the drawing—

Figure 1:
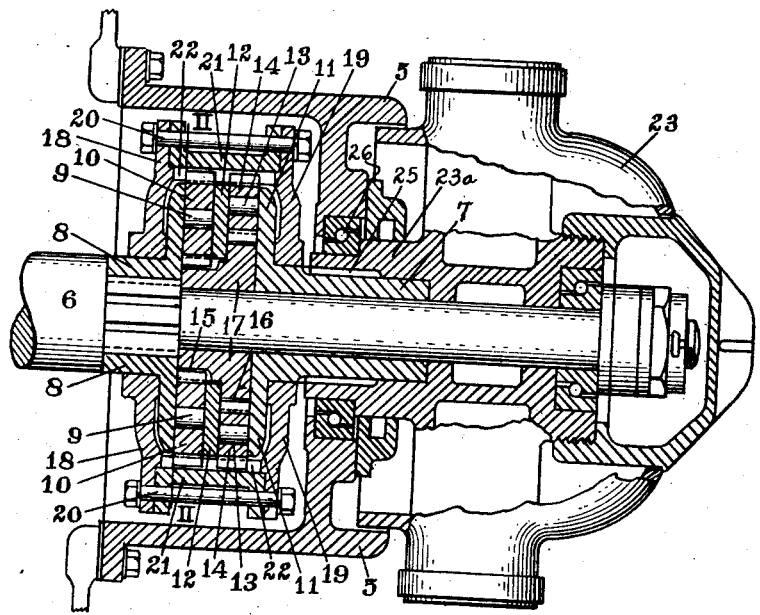
Figure 1 is a vertical longitudinal section with illustrated parts broken out and parts in full.
Figure 2:
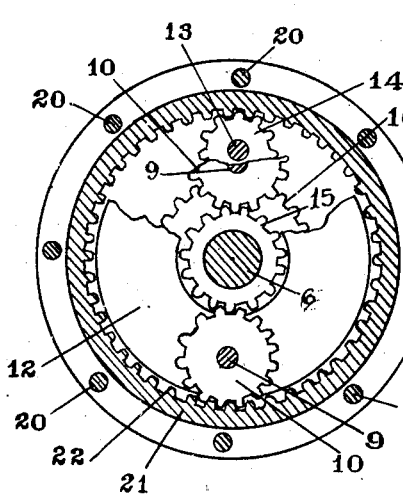
Fig. 2 is mainly a vertical section on the line II—II Fig. 1 with parts broken out and looking to the right.
Figure 3:
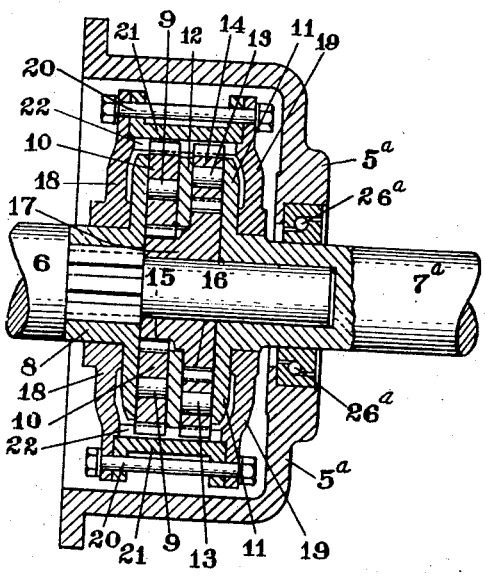
Fig. 3 is a view like Fig. 1 illustrating an application of the invention for purposes other than that shown in Fig. 1.

In the views and more particularly as shown in Fig. 1 the stationary housing of the propeller of an airplane head is designated 5, the power shaft 6 and the driven shaft 7 which as suggested by Fig. 3 is designated 7a thereon can be employed to operate any suitable or desired shaft or object connected therewith.

Splined on the power shaft 6 is a sleeve the hub of which has an axially extending portion 8 which carries stub shafts 9 on which loosely turn spur or planet gears 10.

The driven shaft 7 (or 7a) has a radial extension 11 from which project stub shafts 13, each carrying a spur or planet gear 14. The said spur gears 14 are of smaller diameter than the planet gears 10 and the axes of their shafts 13 are more remote from the axis of the power and driven shafts and travel in a larger circle than do the axes of the shafts having the spur gears 10. The spur or planet gears 10 and 14 engage the toothed rims or sun gears 15 and 16 respectively of a sleeve 17 loose in relation to the power shaft 6. These sun gears are of different diameters to engage the spur gears 10 and 14.

For convenience the pin bearings of the said planet gears and the gears thereon are separated by a spacer ring 12 which holds said planet gears in place on their respective bearings.

Loosely mounted on the power and driven shafts are two disk-like members 18 and 19 having bolted therebetween by bolts 20 a wide ring 21 the latter having around its inner surface gear teeth 22 engaged respectively by the planet gears 10 and 14. The wide ring 21 and its supporting members 18 and 19 constitute a momentum frame which imparts to the device a desired degree of flywheel or stabilizing effect.

The propeller head as shown in Fig. 1 is designated 23 and the hub 23a thereof is keyed at 25 to the tubular driven shaft 7 so that when the said tubular shaft is driven the propeller and the blades (not shown) thereof are rotated. The hub 23a is provided with bearings 26 between it and the housing 5.

In Fig. 3 the stationary housing 5a is of modified form, and the driven shaft 7a is extended through the housing and supported directly by bearings 26a between the housing and the said driven shaft in such manner that a shaft for doing work can be attached to it.

When power is applied to the stub shafts 9 from the driving shaft 6 and the radial extension 11 they tend to drive both sun gears 15 and 16 and the ring 21. The planet gears 10 and 14 engage the inner gear teeth 22 of the ring 21 and transmit power from the driving shaft 6 to the driven shaft 7. The power exerted by the driving shaft varies of course, according to the load or torque of the driven shaft. Stated in another way the power shaft revolves the larger planet gears and their sun gear around the driven shaft thereby causing the driving of the smaller planet gears and transmitting power of the driving shaft to the driven shaft. The driving shaft also tends to drive the sun gear 16 to roll the planet gears 14 within the internal gear 22 of the ring 21 to transmit power from the driving shaft to the driven shaft 7.

In the mechanism herein described the planet sets of gears are shown as duplicates on opposite sides of the shafts, but such gears can be triple or quadruple, equally spaced for balancing around the axis of the shafts.

The mechanism herein described can be operated reversely, that is to say what is herein referred to as the power or driving shaft can be used or become the driven shaft, and what is herein referred to as the driven shaft can be or become the power shaft as for example when the device is employed in motor vehicles as now commonly constructed and is rolling down a hill by the action of gravity.

The forms and dimensions of the parts can be changed and parts omitted without departing from the gist of the invention as claimed.

What I claim is:

1. In a power transmitting mechanism, a driving shaft having a radially extending flange, a driven shaft coaxially aligned with the driving shaft and having a radially extending flange, a rotatable element operably connected to the driven shaft, pinion gears of different diameters carried by each of said flanges, sun gears associated with the pinion gears, and ring gear means engaging the pinion gears and cooperating with the sun gears to transmit power from the pinion gears carried by one of said flanges to the pinion gears carried by the other of said flanges.

2. A power transmitting device comprising axially aligned driving and driven shafts, axially spaced radially extending flanges fixed to said shafts, spaced pinion gears of different diameters carried by each of said flanges, sun gears of different diameters engaging said spaced pinion gears, and a ring gear associated with the pinion gears and cooperating with the sun gears to transmit power from the pinion gears carried by one of said flanges to the pinion gears carried by the other of said flanges.

JAMES S. ALSPAUGH.